US009858373B2

United States Patent
Cho et al.

(10) Patent No.: US 9,858,373 B2
(45) Date of Patent: Jan. 2, 2018

(54) IN-CYCLE RESOURCE SHARING FOR HIGH-LEVEL SYNTHESIS OF MICROPROCESSORS

(71) Applicant: International Business Machines Corporation, Armonk, NY (US)

(72) Inventors: Minsik Cho, Austin, TX (US); Brian R. Konigsburg, Austin, TX (US); Jeonghee Shin, Millwood, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 14/800,685

(22) Filed: Jul. 15, 2015

(65) Prior Publication Data

US 2017/0017747 A1 Jan. 19, 2017

(51) Int. Cl.
  *G06F 9/455* (2006.01)
  *G06F 17/50* (2006.01)

(52) U.S. Cl.
  CPC ........ *G06F 17/5045* (2013.01); *G06F 17/505* (2013.01); *G06F 2217/68* (2013.01)

(58) Field of Classification Search
  USPC ........................................................ 716/134
  See application file for complete search history.

(56) References Cited

U.S. PATENT DOCUMENTS

| 6,704,822 B1 | 3/2004 | Tremblay et al. |
| 8,584,071 B2 | 11/2013 | Markov et al. |
| 8,671,371 B1 * | 3/2014 | Dimond ................ G06F 17/505 716/104 |
| 2016/0299998 A1 * | 10/2016 | Isshiki .................. G06F 17/505 |

OTHER PUBLICATIONS

Hai Lin and Yunsi Fei, Resource Sharing of Pipelined Custom Hardware Extension for Energy-efficient Application-specific Instruction Set Processor Design. 978-1-4244-5028-2, 2009 IEEE. p. 158-165.

Mikhail Smelyanskiy, Hardware/Software Mechanisms for Increasing Resource Utilization on VLIW/EPIC Processors. p. 1-250, University of Michigan, Doctoral Thesis, Dept. of Computer Science and Engineering, 2004.

(Continued)

*Primary Examiner* — Bryce Aisaka
(74) *Attorney, Agent, or Firm* — Rabin Bhattacharya; Otterstedt, Ellenbogen & Kammer, LLP

(57) ABSTRACT

A graph is constructed, having a plurality of nodes representing a plurality of logical operations and a plurality of edges connecting those of the plurality of nodes which do not conflict. A weight, including a width difference between end nodes of each of the edges, is assigned to each edge. Weighted cliques are enumerated, each including at least two of the nodes. Each of the weighted cliques is replaced with a single one of the logical operations and a multiplexer, to obtain a plurality of multiplexer-operation groups, such that each logical operation in one of the multiplexer-operation groups can be shared within a same clock cycle of a digital electronic integrated circuit.

20 Claims, 10 Drawing Sheets

(56) References Cited

OTHER PUBLICATIONS

Scott Cromar et al, FPGA-Targeted High-Level Binding Algorithm for Power and Area Reduction with Glitch-Estimation. DAC'09, Jul. 26-31, 2009, San Francisco, California, USA. p. 1-6 (ACM 2009).

Anonymous, Impact of FPGA Architecture on Resource Sharing in High-Level Synthesis. FPGA '12 Monterey, California, USA. p. 1-10.

Jason Cong et al. Pattern-Based Behavior Synthesis for FPGA Resource Reduction. FPGA'08, Feb. 24-26, 2008, Monterey,California, USA. p. 1-10 ACM 2008.

Wikipedia, Bron-Kerbosch algorithm, downloaded from http://en.wikipedia.org/wiki/Bron%E2%80%93Kerbosch_algorithm on Jun. 8, 2015, p. 1-5.

Alessio Conte, Review of the Bron-Kerbosch algorithm and variations. School of Computing Science, University of Glasgow. May 5, 2013. p. 1-9.

Anonymous, IBM ILOG CPLEX Optimization Studio Community Edition, pp. 1-2, downloaded from http://www01.ibm.com/software/commerce/optimization/cplexoptimizer/ Jul. 11, 2015.

\* cited by examiner

```
if(cond1)
{
    a=b+c;
}
else
{
    a=d+e;
}
```

*FIG. 3*

```
if(cond1)
{
    p1=b;
    p2=c;
}
else
{
    p1=d;
    p2=e;
}
a=p1+p2
```

```
int diff = val - valpred;
    diff -= step;
    diff -= step;

valpred -= vpdiff;
    vpdiff += step;
    vpdiff += step;
    vpdiff += step;
    valpred += vpdiff;
    idx += indexTable(delta);
```

120 —

```
sub_ln212_z = {{16{indata[15]}}, indata} - valprev;
negate_ln214_z = 32'h0 - {1'b1, sub_ln212_z[30:0]};
sub_ln222_z = mux_diff_ln214_z - mux_ret_ln76_z;
sub_ln231_z = mux_diff_ln219_z - mux_ret_ln76_z[14:1];
add_ln223_z = {1'b0, mux_ret_ln76_z} + mux_ret_ln76_z[14:3];
add_ln232_z = {1'b0, mux_vpdiff_ln219_z} + mux_ret_ln76_z[14:1];
add_ln237_z = {1'b0, mux_vpdiff_ln229_z} + mux_ret_ln76_z[14:2];
addsub_32x18_z = valprev + sub_ln242_en + (sub_ln242_en ? ~
add_ln254_z = {index[7], index} + ({5{mux_ret_ln52_z[0]}}, mux_ret_ln52_z};
```

122 —

```
sub30 := lat_diff_1 - conv26;                              --# 220
tmp1 := x"000000000" - vpdiff_2_ALPS_st;
{ sub := conv9 - valprev;                                  --# 203
sub13 := x"000000000" - sub;                               --# 205
sub19 := diff_0 - conv14;                                  --# 213
add32 := conv26 + lat_vpdiff_0;                            --# 221
add42 := vpdiff_1_ALPS_st + conv37;                        --# 226
storemerge := storemerge_p + lat_valprev_ld;
add59 := call5818_ALPS_st + lat_conv4;                     --# 243
add := shr + conv14;                                       --# 214
```

FIG. 5

IN-CYCLE RESOURCE SHARING FOR HIGH-LEVEL SYNTHESIS OF MICROPROCESSORS

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to design automation and the like.

BACKGROUND OF THE INVENTION

Current resource sharing techniques allow sharing based on temporal mutual exclusiveness; multiple operations are assigned to one resource, but at different clock cycles. Current techniques employ scheduling and/or binding to achieve this temporal mutual exclusiveness, and resource sharing happens across multi-cycles.

SUMMARY OF THE INVENTION

Principles of the invention provide techniques for in-cycle resource sharing for high-level synthesis of microprocessors. In one aspect, an exemplary method of preparing a digital electronic integrated circuit implementing a plurality of logical operations and a plurality of branch logic blocks includes constructing a graph having a plurality of nodes representing the plurality of logical operations and a plurality of edges connecting those of the plurality of nodes which do not conflict; assigning to each of the edges a weight including a width difference between end nodes of each of the edges; enumerating weighted cliques each including at least two of the nodes; and replacing each of the weighted cliques with a single one of the logical operations and a multiplexer, to obtain a plurality of multiplexer-operation groups, such that each logical operation in one of the multiplexer-operation groups can be shared within a same clock cycle of the digital electronic integrated circuit.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Area reduction;
Power reduction.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 3 and 4 compare C++ compiler optimization with an approach suitable for a SystemC to RTL compiler, in accordance with an aspect of the invention;

FIG. 5 compares several current techniques to operation reduction in-cycle, in accordance with an aspect of the invention;

DETAILED DESCRIPTION OF PREFERRED EMBODIMENTS

One or more embodiments relate to resource sharing. As noted, current resource sharing techniques allow sharing based on temporal mutual exclusiveness; multiple operations are assigned to one resource, but at different clock cycles. That is to say, in current techniques, a resource can be shared when it is not being used at the same time (same clock cycle) by two different operations. Current techniques employ scheduling and/or binding to achieve this temporal mutual exclusiveness, and resource sharing happens across multi-cycles. Current techniques typically employ bipartite matching (or pairing) via temporal mutual exclusiveness. Current techniques include, for example, use of a SystemC (discussed below) to RTL compiler or high-level synthesis. Current techniques can identify that the same resource is needed by two different operations at different clock times.

In contrast, one or more embodiments are directed to control mutual exclusiveness, provided by branch analysis, wherein sharing happens in-cycle. Indeed, one or more embodiments permit sharing of resources within the same clock cycle, by recognizing that the result from the resource will not be needed for one of the two operations.

It is worth noting that one or more embodiments are implemented during the process of integrated circuit design, when a hardware description is compiled in HDL (hardware description language) or SystemC. System C is a set of C++ classes and macros which provide an event-driven simulation interface. These facilities enable a designer to simulate concurrent processes, each described using plain C++ syntax. SystemC processes can communicate in a simulated real-time environment, using signals of all the datatypes offered by C++, some additional ones offered by the SystemC library, as well as user defined. In certain respects, SystemC deliberately mimics the hardware description languages VHDL and Verilog, but is more aptly described as a system-level modeling language.

Figure 2:
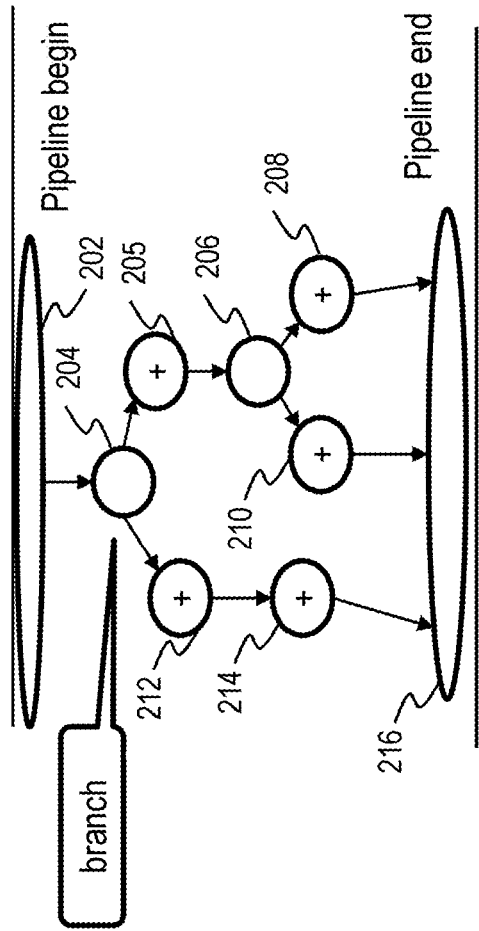
FIG. 2 shows pipelining in a SystemC to RTL compiler, in accordance with an aspect of the invention.
Figure 1:
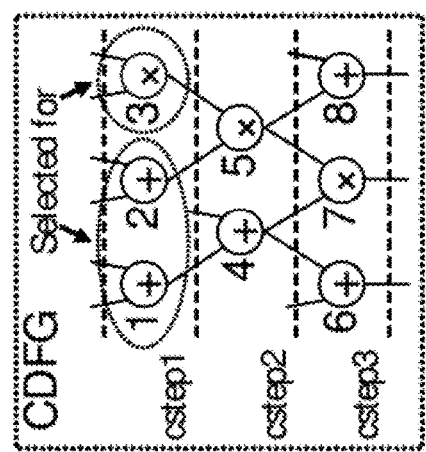
FIG. 1 shows conventional resource sharing, in accordance with the prior art.

FIG. 1 shows conventional resource sharing, in accordance with the prior art. Temporal mutual exclusiveness based on pipelining is employed. The pipeline can be altered in case resource constraints cannot be met. A CDFG (Control Data Flow Graph) is the output from a C++ compiler before mapping the graph into assembly language (an intermediate result). FIG. 2 shows pipelining in a SystemC to RTL compiler, in accordance with an aspect of the invention. Temporal mutual exclusiveness based on pipelining cannot be used in such case, as the same is, in essence, part of micro-architecture (e.g., instructions sharing adder). Furthermore, in a SystemC to RTL compiler, the pipeline is architecturally fixed for complex control (speculation, flush, and/or bypass).

In FIG. 2, the pipeline begins at 202. In 204, a branch is encountered. Control flow proceeds to either adder 212 or adder 205. If flow proceeds to adder 212, it then moves to adder 214, and then to the pipeline end at 216. On the other hand, if, at branch 204, flow proceeded to adder 205, it would next proceed to branch 206; control flow then proceeds to either adder 210 or adder 208, and then in either case to the pipeline end at 216. One or more embodiments recognize that in a branch, if one possibility is followed (e.g., to adder 212), the other is not (e.g., to adder 205). Therefore, a resource can be shared within a clock cycle when, because of branching, the result from the resource will not be needed for one of the two operations.

FIGS. 3 and 4 compare C++ compiler optimization with an approach suitable for a SystemC to RTL compiler, demonstrating opportunities for resource sharing in the latter case (i.e., SystemC to RTL compiler). C++ compiler optimization is not ideal in the latter case, because a C++ compiler cares about cycles per instruction (CPI; also called clock cycles per instruction or clocks per instruction), while the latter case cares about hardware quality. Furthermore, all possible execution cases should be optimized in the latter case, but only the common cases will be optimized in a C++ compiler. Furthermore, loads and/or stores are treated as critical operations in a C++ compiler, but are simply wires in the latter case. In addition, branches are treated as critical operations in a C++ compiler, but are readily implemented as multiplexers in the latter case. On the other hand, addition is a mere one-cycle operation in a C++ compiler, but consumes a large silicon area in the latter case. These aspects are illustrated in FIGS. 3 and 4. FIG. 3 shows typical C++ code, which is simple, clean, intuitive, and employs two additions. FIG. 4 shows an approach preferred for the latter case, with a single addition only. The loads and stores are implemented as wires. However, this approach may not appear to be easy for designers.

FIGS. 3 and 4 thus illustrate an exemplary benefit that can be obtained from one or more embodiments. In the SystemC to RTL compiler approach, hardware is described in SystemC, which is very close to C++. After compilation, a VHDL file is obtained. It is significant to note that the goal in hardware design is different than the goal in a conventional C++ compiler. A C++ compiler will seek to optimize the common case; making same compact for execution on a microprocessor. In hardware, all possible cases need to be addressed, not merely common cases. In hardware design, minimizing the common case at the cost of reducing worst case is not beneficial, because worst case determines the operation clock frequency of the design. In FIG. 3, the IF-ELSE structure is mutually exclusive; either the condition is true, in which case the first code segment is executed, or it is not true, in which case the second code segment is executed. In each case, only one ADD instruction needs to be run on the microprocessor. FIG. 4 shows the desirable approach for the hardware case. Multiplexing is carried out prior to the ADD and the output from the multiplexer is used to drive the adder.

FIG. 5 compares the hardware description language results for an exemplary adaptive differential pulse-code modulation (ADPCM) encoder for SystemC, at 118 (note nine operations); Verilog from Cadence Design Systems, Inc., San Jose, Calif., USA, at 120 (note nine operations); and VHDL (VHSIC Hardware Description Language; VHSIC=very high speed integrated circuit) from a SystemC to RTL compiler, in accordance with an aspect of the invention, at 122. Note at 122 ten operations; two small instructions have been replaced by an ADD. Operation reduction in-cycle is novel and significantly impacts hardware, inasmuch as fewer operation means smaller area, and smaller area means less power consumption and cheaper hardware.

Figure 6:
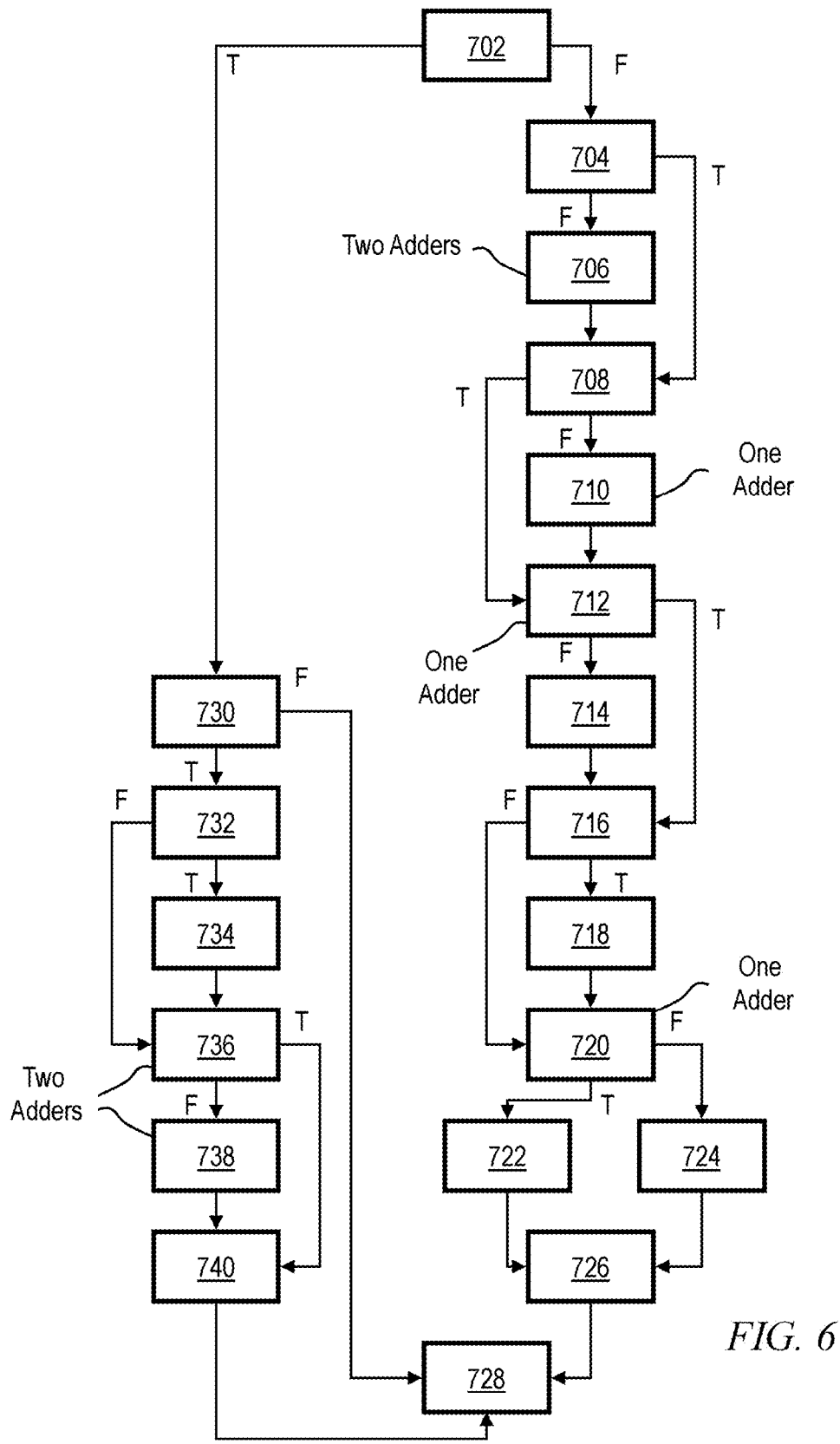
FIG. 6 shows a control flow graph with an example of how a required number of adders can be reduced, in accordance with an aspect of the invention.

FIG. 6 shows a control flow graph with an example of how a required number of adders can be reduced, corresponding to the exemplary adaptive differential pulse-code modulation (ADPCM) encoder. In particular, FIG. 6 shows a control flow graph after compiling the hardware description with a conventional C compiler. Each box represents one or more lines of instructions. Box 702 has a true branch and a false branch. If the true branch is followed, flow passes to box 730, which also has a true branch and a false branch. If the false branch of box 730 is followed, flow proceeds to box 728. If the true branch of box 730 is followed, flow proceeds to box 732, which also has a true branch and a false branch. If the true branch of box 732 is followed, flow proceeds to box 734 and then box 736, while if the false branch of box 732 is followed, flow proceeds to directly to box 736, bypassing box 734. Box 736 has a true branch and a false branch. If the false branch of box 736 is followed, flow proceeds to box 738 and then box 740, while if the true branch of box 736 is followed, flow proceeds to directly to box 740, bypassing box 738. Flow then proceeds from box 740 to box 728.

If the FALSE branch of box 702 is followed, flow passes to box 704, which also has a true branch and a false branch. If the false branch of box 704 is followed, flow proceeds to box 706 and then box 708, while if the true branch of box 704 is followed, flow proceeds to directly to box 708, bypassing box 706. Box 708 also has a true branch and a false branch. If the false branch of box 708 is followed, flow proceeds to box 710 and then box 712, while if the true branch of box 708 is followed, flow proceeds to directly to box 712, bypassing box 710. Box 712 also has a true branch and a false branch. If the false branch of box 712 is followed, flow proceeds to box 714 and then box 716, while if the true branch of box 712 is followed, flow proceeds to directly to box 716, bypassing box 714. Box 716 also has a true branch and a false branch. If the true branch of box 716 is followed, flow proceeds to box 718 and then box 720, while if the false branch of box 716 is followed, flow proceeds to directly to box 720, bypassing box 718. Box 720 also has a true branch and a false branch. If the true branch of box 720 is followed, flow proceeds to box 722 and then box 726, while if the false branch of box 720 is followed, flow proceeds to box 724 and then box 726. Flow proceeds from box 726 to box 728.

Accordingly, some boxes 702, 704, 708, 712, 716, 720, 730, 732, 736 have T (true) and F (false) branches—thus there is branching and/or control flow. The left side (true branch of box 702) shows four adders (two each in boxes 736, 738) while the right side (false branch of box 702) shows five adders (two adders in box 706 and one each in boxes 710, 712, 720). Naively, to deal with the worst case, nine adders are needed. However, by considering the branching, only five adders are needed (paths not followed are don't-cares—either T or F from box 702 is followed). The branching is taken into consideration before generating the HDL. Expensive operators besides adders can also be shared in this manner.

Consider an algorithm for resource sharing in-cycle. In one or more embodiments, the problem can be mapped into Maximum Weighted Clique Enumeration. The number of enumerated cliques equals the minimum number of resources. Each clique tells which operations can share the same resource. In at least some instances, a Modified Bron-Kerbosch algorithm can be used. One or more embodiments can be applied for area-consuming instructions such as add, subtract, multiply, divide, shift, and so on, taking due consideration of appropriate trade-offs. With regard to area, sharing resources will reduce area, while with regard to timing, added multiplexer(s) will increase logic-depth.

Figure 7:
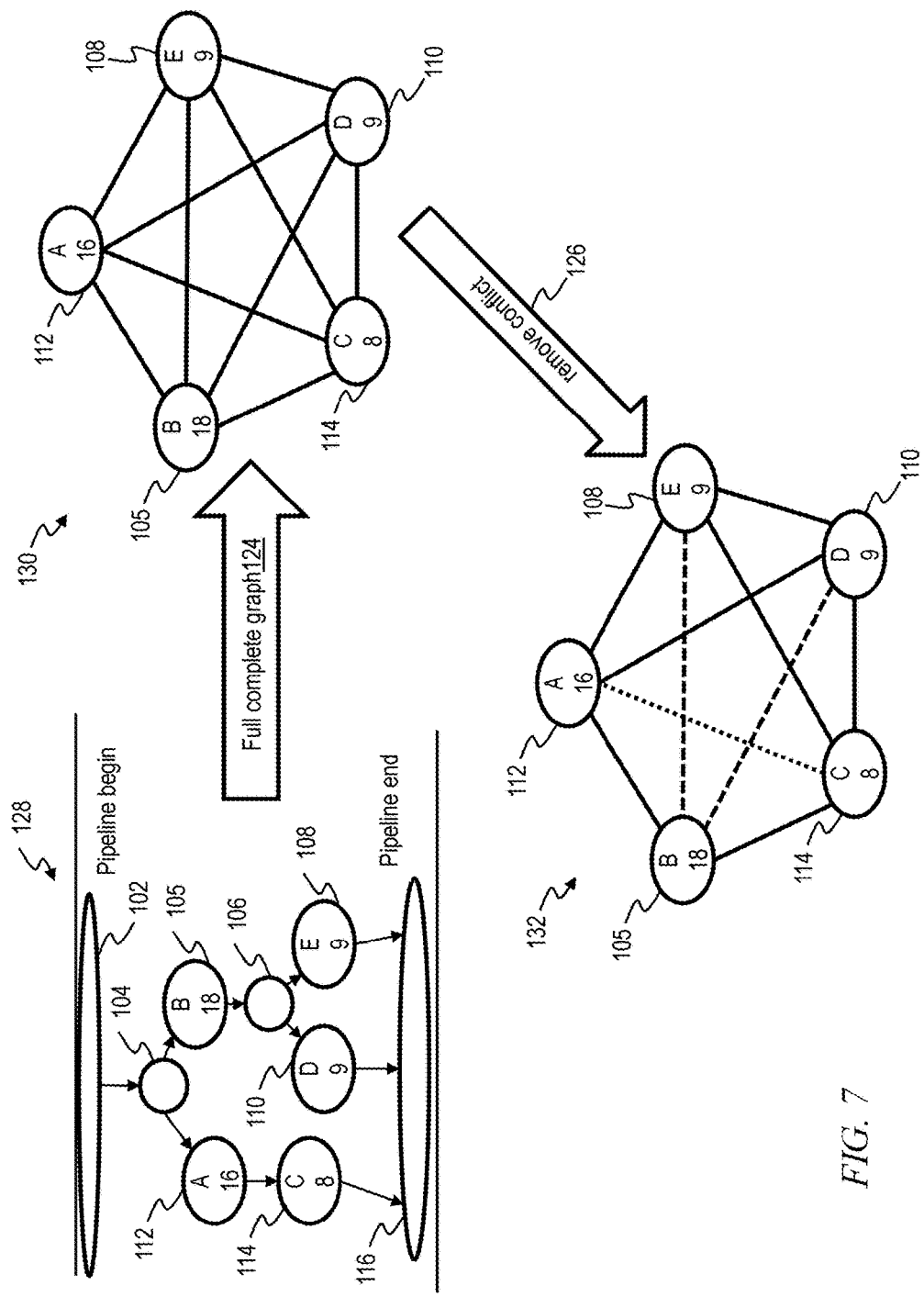
FIG. 7 shows exemplary graph construction, in accordance with an aspect of the invention.

FIG. 7 shows exemplary graphical analysis where A, B, C, D, and E are the same type of operators, with the width of each operator. As seen at 128, the pipeline begins at 102. In 104, a branch is encountered. Control flow proceeds to either operator A 112 or operator B 105. If flow proceeds to operator A 112, it then moves to operator C 114, and then to the pipeline end at 116. On the other hand, if, at branch 104, flow proceeded to operator B 105, it would next proceed to branch 106; control flow then proceeds to either operator D 110 or operator E 108, and then in either case to the pipeline end at 116. The operators are thus nodes in the graph. As seen at 124, make a complete graph 130, with each node connected. Traverse back from the end to the beginning of the graph. As seen at 126, based on graph traversal, remove edges between nodes where there is a conflict and resources cannot be shared, obtaining the final result 132 (edges connecting nodes where there is a conflict shown in dashed lines). In the non-limiting example of FIG. 7, conflicts are between A-C, B-D, and B-E. A full branch analysis is employed to detect the conflicts.

Elements A, B, C, D, and E represent logical operations that it is desired to translate into circuitry.

Figure 8:
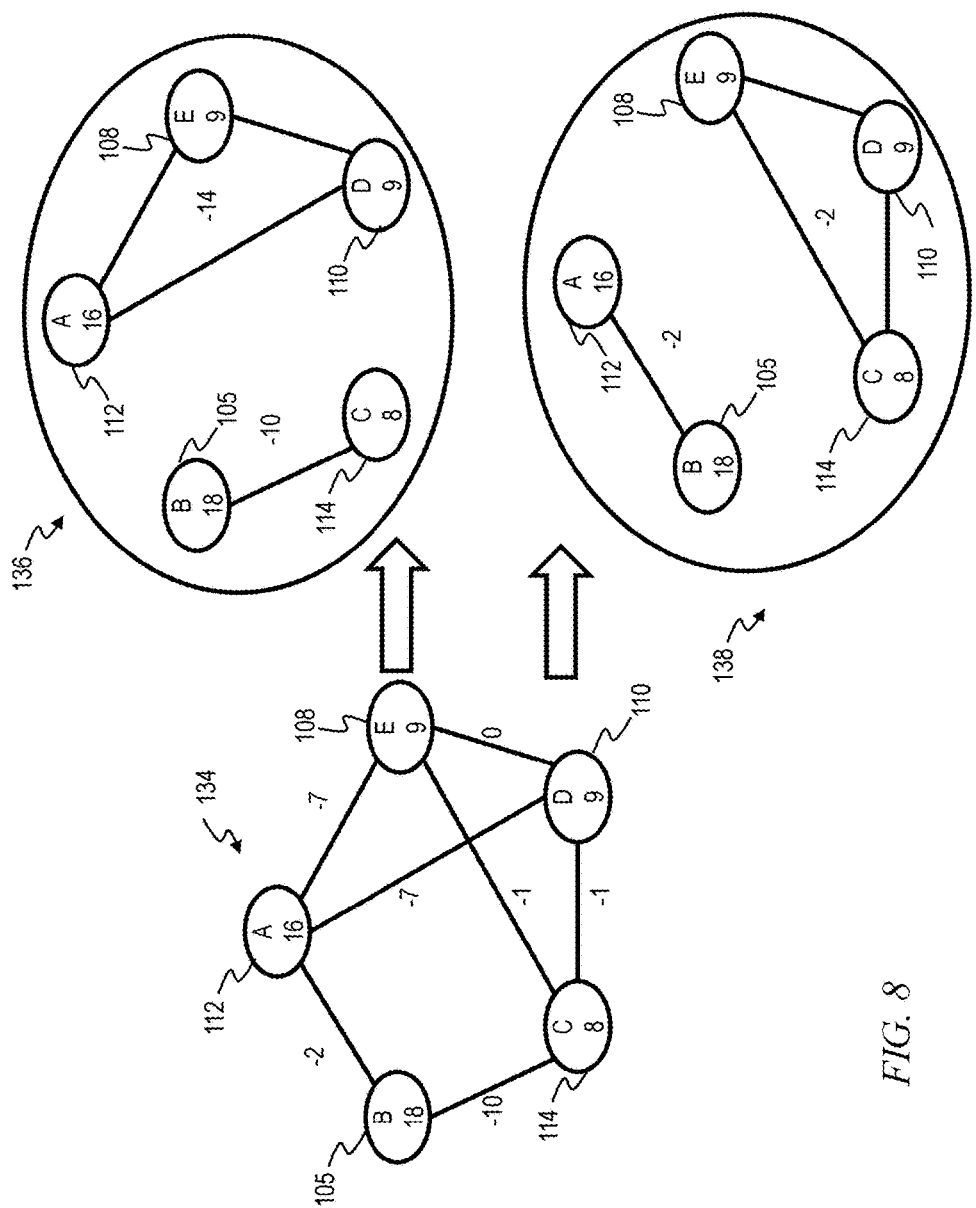
FIG. 8 shows exemplary maximum clique enumeration, in accordance with an aspect of the invention.

FIG. 8 shows how to determine the maximum clique. In the mathematical area of graph theory, a clique is a subset of vertices of an undirected graph, such that its induced subgraph is complete; that is, every two distinct vertices in the clique are adjacent. Cliques are one of the basic concepts of graph theory and are used in many other mathematical problems and constructions on graphs. Once the graph 134 (with conflicts removed) has been obtained, assign a negative weight to each edge (the difference in terms of the hardware side). The edge cost equals the width difference. For example, the edge A-B has a weight of negative two. Furthermore in this regard, the values in the circles represent the widths in the hardware implementation, while the negative weights on the edge represent the size difference between two connected circles. Element B has an expected hardware width of eighteen while element A has an expected hardware width of sixteen. Therefore, the difference between sizes of A and B is represented as −2 on the edge between A and B. The implementation implication of the edges means that sharing two operators (in circles) with bigger number is more desirable as they are similar in size, thus allowing the shared operator to be utilized more. If two operators to be shared have largely different widths, it means the operator will sit idle and generate many don't care bits under some conditions, wasting area and power. This motivates one to find the maximum weight clique enumeration for better hardware utilization.

In the example of FIG. 8, there are two possible outcomes after resource sharing is done, when the edge weight is not considered where both have the same number of cliques, thus the same number of operator reduction. In spite of the same number of operators after reduction, the actual hardware implementation cost is very different due to the size difference between shared resources. It can be seen that operators at similar sizes are shared in 138 better than in 136, and the quantified metric to determine superiority is proposed as the summation of the total edge weights after sharing. The cost for the solution in 138 is negative four (−2+(−2)) while the cost for the solution 136 is negative twenty-four (−10+(−14)).

Furthermore in this regard, in graph 134, there are sixty total adder bits (16 for A plus 18 for B plus 8 for C plus 9 for D plus 9 for E). In the approach shown at 136, the final number of adder bits is thirty-four (16 for A plus 18 for B) while the multiplexer overhead is eighteen bits for two-way multiplexers and sixteen bits for three-way multiplexers. On the other hand, in the approach shown at 138, there is a greater saving, inasmuch as the final number of adder bits is twenty-seven (18 for B plus 9 for E) while the multiplexer overhead is eighteen bits for two-way multiplexers and nine bits for three-way multiplexers. A multiplexer is added because it was decided to share the adders in this example. Hence, the total area saving is:

reduced_adder_area−#added_mux_area.

In most cases, a mux (multiplexer) is smaller than an adder at the same input size, so there is a high chance that the total area saving is positive. Also, adding a mux increases the logic depth which can degrade the timing as well. Thus, as will be appreciated by the skilled artisan given the teachings herein, this trade-off should be carefully explored to get the best outcome.

Figure 9:
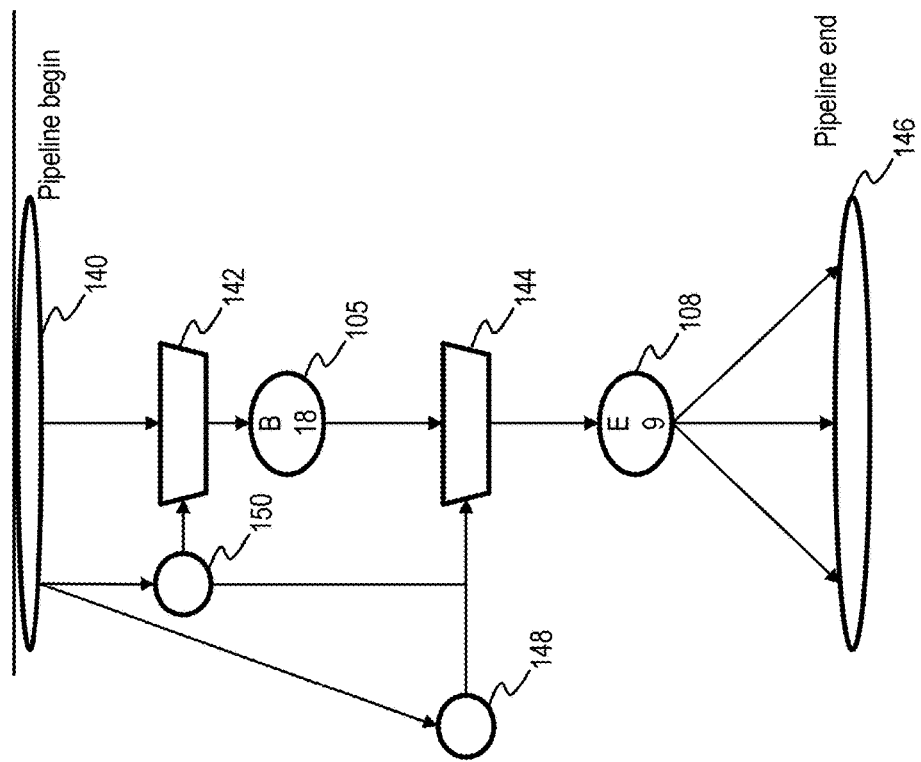
FIG. 9 shows exemplary change in a control data flow graph, in accordance with an aspect of the invention.

Referring now to FIG. 9, the configuration shown at 128 is modified (change in CDFG) by employing multiplexers 142, 144 controlled by appropriate control signals. The modified pipeline begins at 140. Elements A 112 and B 105 are shared, as are elements C 114, D 110, and E 108. There is a multiplexer and a single adder (or other operator) per clique—the multiplexer provides variable input only (no don't-cares). That is to say, the clique of A and B in view 138 is implemented as multiplexer 142 and element B 105, while the clique of E, C, and D in view 138 is implemented as multiplexer 144 and element E 108. Branch logic 150 can provide a control signal to either of the multiplexers 142, 144 while branch logic 148 can provide a control signal to multiplexer 144. Element B 105 in FIG. 9 fulfills the role of element A 112 or element B 105 in FIGS. 7 and 8, as the case may be. Branch logic 150, analogous to branch logic 104, causes multiplexer 142 to output to element B the data that would be seen by element B in FIG. 7, if the branch 104 was to element B. Branch logic 150 causes multiplexer 142 to output to element B the data that would be seen by element A in FIG. 7, if the branch 104 was to element A.

Element E 108 in FIG. 9 fulfills the role of element C 114, element D 110, or element E 108 in FIGS. 7 and 8, as the case may be. If branch 104 branched to element A, then branch logic 150 applies a control signal to multiplexer 144 to pass to element E 108 in FIG. 9 the output from element B 105 functioning as element A 112. If branch 104 branched to element B, then, as noted, branch logic 150, analogous to branch logic 104, causes multiplexer 142 to output to element B the data that would be seen by element B in FIG. 7. Furthermore, if branch 104 branched to element B, then branch logic 148, analogous to branch logic 106, causes multiplexer 144 to output to element E the data that would be seen by:

element D in FIG. 7, if branch logic 106 branched to element D; or element E in FIG. 7, if branch logic 106 branched to element E.

The modified pipeline ends at 146, wherein element E 108 outputs the equivalent of element C, D, or E in FIG. 7 view 128, as the case may be.

A CDFG or Control Data Flow Graph is the output from the C++ compiler before mapping the graph into assembly language (an intermediate result). A control flow graph (CFG) in computer science is a representation, using graph notation, of all paths that might be traversed through a program during its execution.

Figure 10:
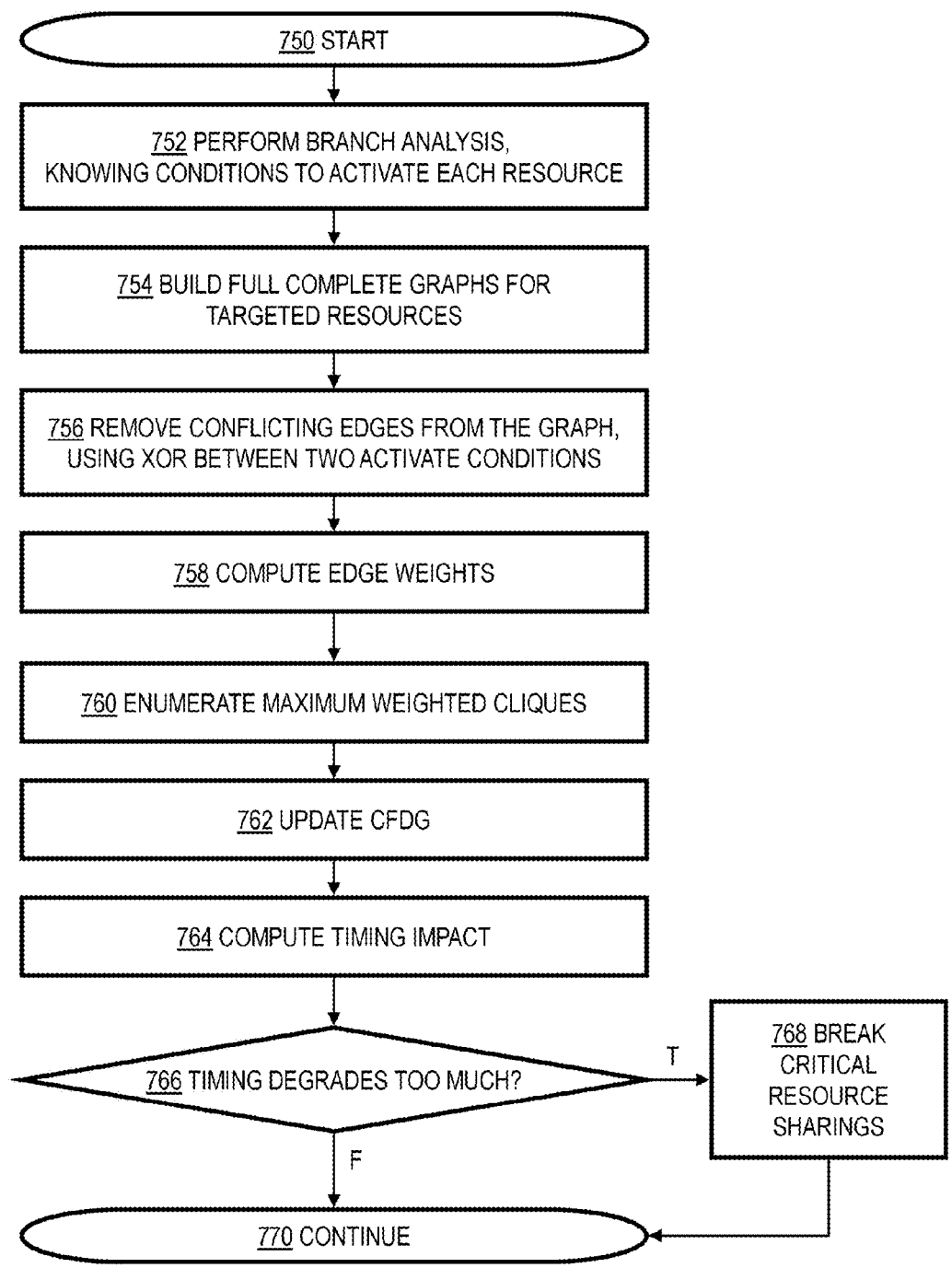
FIG. 10 is a flow chart of an exemplary method, in accordance with an aspect of the invention.

FIG. 10 shows an exemplary technique, according to an aspect of the invention. The flow chart begins at 750. In step 752, perform branch analysis, knowing the conditions to activate each resource. In step 754, build full complete graphs for targeted resources. In step 756, remove conflicting edges from the graph. Use an exclusive OR (XOR) between two activate conditions. In step 758, compute edge weights. In step 760, enumerate maximum weighted cliques. In step 762, update the CDFG. In step 764, compute the timing impact (for example, measure timing at the IR (intermediate representation) level). In step 766, determine whether the timing degrades too much from the proposed resource sharing(s). For example, compare to design requirements, and run a timing analysis tool. If not (F branch), processing continues at 770. If so (T branch), in step 768, break critical resource sharing(s) and proceed to 770.

Thus, one or more embodiments provide resource sharing in-cycle for pipelined design. Heretofore, conventional resource sharing in high-level synthesis targets for between-cycle optimization: assigning multiple operations "at different cycles" to one resource. However, in pipelined design (such as in a microprocessor), sharing resources in-cycle is more important, as cycle behavior of a pipeline stage is fixed and/or given, making the existing solutions inapplicable to high-level synthesis of microprocessors. Indeed, one or more embodiments efficiently share resources among operations in the same cycle, but on a different execution path. As a result, one or more embodiments can achieve effective area-timing trade-off.

Indeed, one or more embodiments share resources among operations that need to be executed in the same clock cycle (or in-cycle), by figuring out the architecturally/algorithmically disjoint operations. Advantageously, one or more embodiments share disjoint resources in high level synthesis and/or target resource-sharing in the same cycle yet algorithmically disjoint.

One or more embodiments of the invention, or elements thereof, can be implemented, at least in part, in the form of an apparatus including a memory and at least one processor that is coupled to the memory and operative to perform exemplary method steps.

Figure 11:
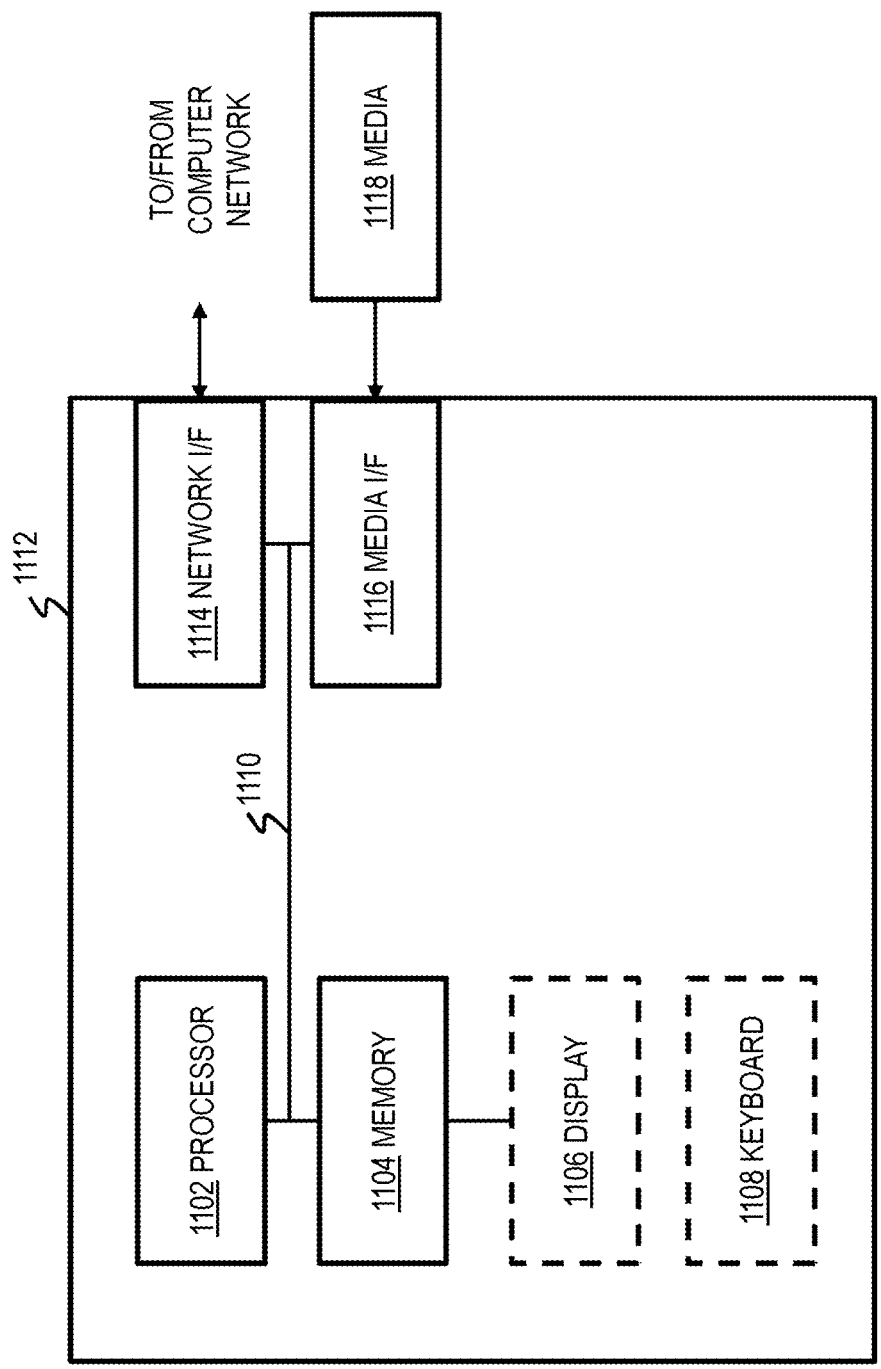
FIG. 11 depicts a computer system that may be useful in implementing one or more aspects and/or elements of the invention.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

It should be noted that any of the methods described herein can include an additional step of providing a system comprising distinct software modules embodied on a computer readable storage medium (e.g., persistent storage portion of memory 1104); the modules can include, for example, any or all of the elements depicted in the block diagrams or other figures and/or described herein. For example, the modules could include the System C set of C++ classes and macros which provide an event-driven simulation interface; a C++ compiler; a module to construct the conflict graph; a module to assign weights; a module to enumerate weighted cliques (e.g., the IBM ILOG CPLEX Optimizer/via modified Bron-Kerbosch technique); and a module to replace each of the weighted cliques with a single one of the logical operations and a multiplexer. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

Given the discussion thus far, it will be appreciated that, in general terms, an exemplary method of preparing (e.g. designing and optionally then manufacturing) a digital electronic integrated circuit implementing a plurality of logical operations and a plurality of branch logic blocks, includes the step 754 of constructing a graph having a plurality of nodes representing the plurality of logical operations and a plurality of edges connecting those of the plurality of nodes which do not conflict. Refer to graphs 130 and 132. In one or more embodiments, the starting point is a control flow graph obtained by using, e.g., SYSTEM C libraries compiled by any C++ compiler to construct the control flow graph. Other embodiments could use another hardware specification language; even FORTRAN. One or more embodiments take the control flow graph as a given and construct a conflict graph using one or more software modules implementing aspects of the invention. In other embodiments, construction of the control flow graph is part of the method.

A further step 758 includes assigning to each of the edges a weight including a width difference between end nodes of each of the edges. See view 134. In general, negative weights can be used with maximum weighted cliques or positive weights can be utilized with minimum weighted cliques. This step can also be carried out using one or more software modules implementing aspects of the invention. From the control flow graph, it is possible to see operations such as addition and subtraction. Each operation has a bit width, e.g., 10 bits, 16 bits. Consider a design just compiled into a control flow graph using SYSTEM C and a C++ compiler. The graph has nodes and many operators. Suppose it is decided to minimize the number of additions by enabling resource sharing. Each addition has a width, e.g., 16 bits, 32 bits. Once all the adders and corresponding numbers are identified, each operator becomes a graph node. Refer to the pentagonal conflict graph construction in FIGS. 7 and 8. If there were ten adders in the control flow graph then there will be ten nodes in the conflict graph. Each node will have a number from the control flow graph. Collect all and see which ones have a conflict, by graph traversal. Then compute the differences for all the edges (can be plus or minus depending on maximum weight or minimum weight).

An even further step 760 includes enumerating weighted cliques each including at least two of the nodes. Refer to graphs 136, 138. In one or more embodiments, this step can be carried out using commercially available software; for example, the IBM ILOG CPLEX Optimizer available from International Business Machines Corporation, Armonk, N.Y., USA.

Yet a further step includes replacing each of the weighted cliques with a single one of the logical operations and a multiplexer, to obtain a plurality of multiplexer-operation groups, such that each logical operation in one of the multiplexer-operation groups can be shared within a same clock cycle of the digital electronic integrated circuit. Refer to FIG. 9. This step can also be carried out using one or more software modules implementing aspects of the invention.

Optionally, translate the modified control flow graph such as that of FIG. 9 into VHDL or the like and instantiate it as a physical circuit.

In some instances, the assigned weights have values no less than zero, and the enumerated weighted cliques include minimum weighted cliques.

On the other hand, in some cases, such as in the non-limiting examples, the assigned weights have values no greater than zero, and the enumerated weighted cliques include maximum weighted cliques.

In some cases, the step of constructing the graph with the plurality of nodes and the plurality of edges connecting those of the plurality of nodes which do not conflict includes the sub-step of constructing a preliminary graph having the plurality of nodes representing the plurality of logical operations and a plurality of preliminary edges connecting all of the nodes. Refer to step 754 and graph 130. A further sub-step includes, based on an analysis of the plurality of branch logic blocks, removing from the preliminary graph those of the plurality of preliminary edges connecting those of the plurality of nodes which do conflict, to leave the edges connecting those of the plurality of nodes which do not conflict. Refer to step 756 and graph 132.

In some cases, further steps include updating a control data flow graph representing the digital electronic integrated circuit based on the enumerated maximum weighted cliques (refer to step 762); computing timing impact of the updated control data flow graph (refer to step 764); and eliminating selected sharing of the logical operations if the timing impact indicates excessive timing degradation (refer to step 766 T to step 768).

In one or more embodiments, the enumerating of the maximum weighted cliques is carried out via a modified Bron-Kerbosch technique.

Non-limiting examples of logical operations include addition, subtraction, multiplication, division, and shift.

Again, in some cases, a further step includes fabricating the integrated circuit with the plurality of multiplexer-operation groups.

In another aspect, an exemplary apparatus includes a memory (e.g., RAM part of memory 1104); at least one processor (e.g., 1102), coupled to the memory; and a non-transitory computer readable medium (e.g., hard drive or other persistent storage part of memory 1104) including computer executable instructions which when loaded into the memory configure the at least one processor to carry out or otherwise facilitate any one, some, or all of the method steps disclosed herein.

Exemplary Integrated Circuit and Design Structure Details

One or more exemplary methods as described herein can be used in the fabrication, testing, or operation of integrated circuit chips. The integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 12:
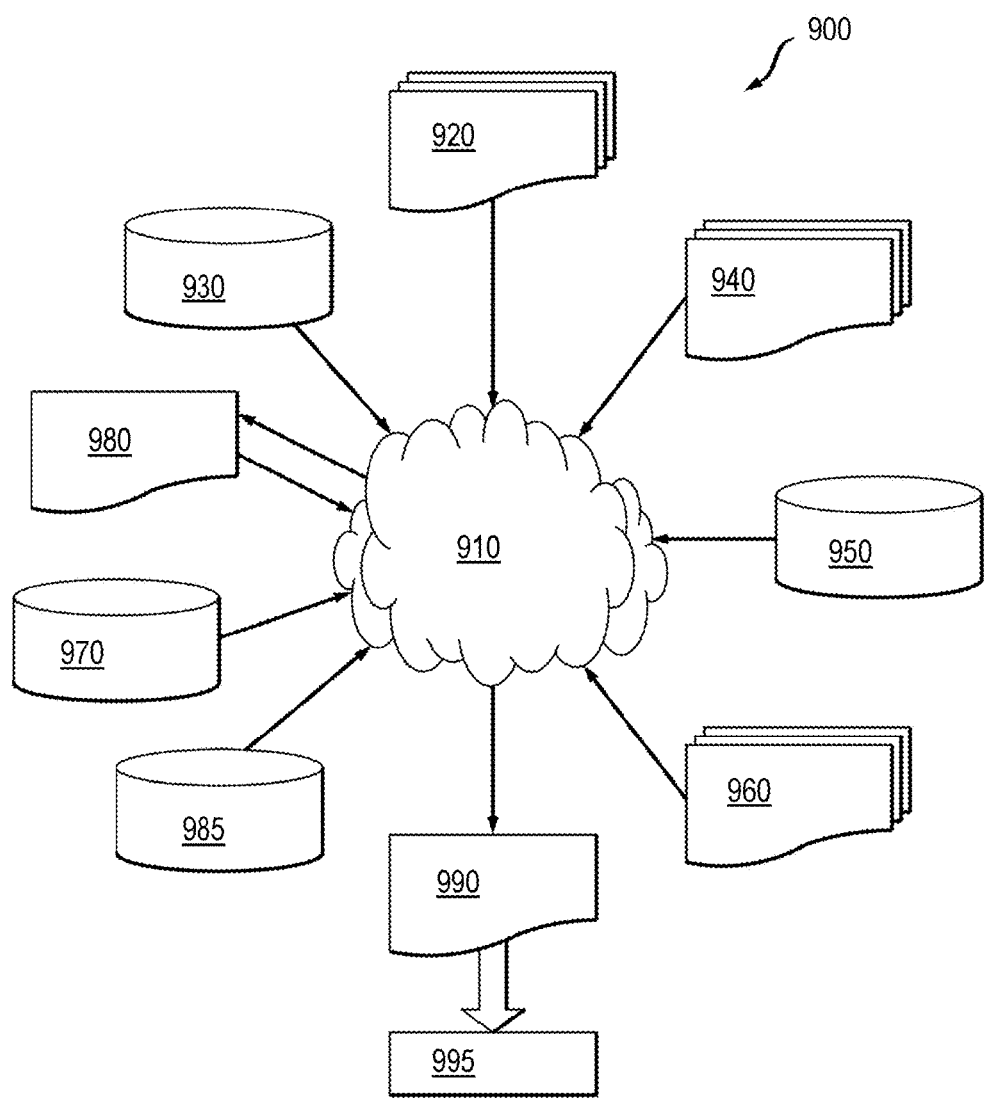
FIG. 12 is a flow diagram of a design process used in semiconductor design, manufacture, and/or test.

FIG. 12 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the desired design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer.

When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a Netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including Netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more circuits. In one embodiment, design structure 990 may comprise a compiled, executable HDL simulation model that functionally simulates devices or circuits.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a desired circuit, device or structure. Design structure 990 may then proceed to a stage 995 where, for example, design structure 990: proceeds to tape-out, is released to manufacturing, is released to a mask house, is sent to another design house, is sent back to the customer, etc.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of preparing a digital electronic integrated circuit implementing a plurality of logical operations and a plurality of branch logic blocks, said method comprising:
   acquiring from a gate array or from a machine readable storage medium an input design structure representing a physical structure of said plurality of logical operations and said plurality of branch logic blocks in said digital electronic integrated circuit;
   constructing a graph having a plurality of nodes representing said plurality of logical operations and a plurality of edges connecting those of said plurality of nodes which do not conflict;
   assigning to each of said edges a weight comprising a bit width difference between end nodes of each of said edges;
   enumerating weighted cliques each comprising at least two of said nodes representing respective ones of the logical operations that can share a same clock cycle of said digital electronic integrated circuit;
   generating a plurality of multiplexer-operation groups by replacing each of said weighted cliques with a single one of said logical operations and a multiplexer, such that each logical operation in one of said multiplexer-operation groups can be shared among at least two of said plurality of branch logic blocks within a same clock cycle of said digital electronic integrated circuit; and
   configuring an output design structure incorporating said multiplexer-operation groups for fabricating said digital electronic integrated circuit.

2. The method of claim 1, wherein said assigned weights have values no less than zero, and wherein said enumerated weighted cliques comprise minimum weighted cliques.

3. The method of claim 1, wherein said assigned weights have values no greater than zero, and wherein said enumerated weighted cliques comprise maximum weighted cliques.

4. The method of claim 3, wherein said constructing of said graph comprises:
   constructing a preliminary graph having said plurality of nodes representing said plurality of logical operations and a plurality of preliminary edges connecting all of said nodes; and
   based on an analysis of said plurality of branch logic blocks, removing from said preliminary graph those of said plurality of preliminary edges connecting those of said plurality of nodes which do conflict, to leave said edges connecting those of said plurality of nodes which do not conflict.

5. The method of claim 4, further comprising:
   updating a control data flow graph representing said digital electronic integrated circuit based on said enumerated maximum weighted cliques;
   computing timing impact of said updated control data flow graph; and
   eliminating selected sharing of said logical operations if said timing impact indicates excessive timing degradation.

6. The method of claim 5, wherein said enumerating of said maximum weighted cliques is carried out via a modified Bron-Kerbosch technique.

7. The method of claim 6, wherein said logical operations each comprise one of addition, subtraction, multiplication, division, and shift.

8. The method of claim 7, further comprising fabricating said integrated circuit with said plurality of multiplexer-operation groups.

9. An apparatus for preparing a digital electronic integrated circuit implementing a plurality of logical operations and a plurality of branch logic blocks, said apparatus comprising:
   a memory;
   at least one processor, coupled to said memory; and
   a non-transitory computer readable medium comprising computer executable instructions which when loaded into said memory configure said at least one processor to:

acquire from a gate array or from a machine-readable storage medium an input design structure that represents a physical structure of said plurality of logical operations and said plurality of branch logic blocks in said digital electronic integrated circuit;

construct, in said memory, a graph of said input design structure, said graph having a plurality of nodes representing said plurality of logical operations and a plurality of edges connecting those of said plurality of nodes which do not conflict;

assign, in said memory, to each of said edges a weight comprising a bit width difference between end nodes of each of said edges;

enumerate, in said memory, weighted cliques each comprising at least two of said nodes representing respective ones of the logical operations that can share a same clock cycle of said digital electronic integrated circuit;

generate, in said memory, a plurality of multiplexer-operation groups by replacing each of said weighted cliques with a single one of said logical operations and a multiplexer, such that each logical operation in one of said multiplexer-operation groups can be shared within a same clock cycle of said digital electronic integrated circuit; and configure an output design structure incorporating said multiplexer-operation groups in an integrated circuit manufacturing machine for fabricating said digital electronic integrated circuit.

10. The apparatus of claim 9, wherein said assigned weights have values no less than zero, and wherein said enumerated weighted cliques comprise minimum weighted cliques.

11. The apparatus of claim 9, wherein said assigned weights have values no greater than zero, and wherein said enumerated weighted cliques comprise maximum weighted cliques.

12. The apparatus of claim 11, wherein said constructing of said graph comprises:

constructing a preliminary graph having said plurality of nodes representing said plurality of logical operations and a plurality of preliminary edges connecting all of said nodes; and based on an analysis of said plurality of branch logic blocks, removing from said preliminary graph those of said plurality of preliminary edges connecting those of said plurality of nodes which do conflict, to leave said edges connecting those of said plurality of nodes which do not conflict.

13. The apparatus of claim 12, wherein said instructions further configure said at least one processor to:

update a control data flow graph representing said digital electronic integrated circuit based on said enumerated maximum weighted cliques;

compute timing impact of said updated control data flow graph; and eliminate selected sharing of said logical operations if said timing impact indicates excessive timing degradation.

14. The apparatus of claim 13, wherein said enumerating of said maximum weighted cliques is carried out via a modified Bron-Kerbosch technique.

15. The apparatus of claim 14, wherein said logical operations each comprise one of addition, subtraction, multiplication, division, and shift.

16. A non-transitory computer readable medium comprising computer executable instructions which when executed by a computer cause the computer to perform a method of preparing a digital electronic integrated circuit implementing a plurality of logical operations and a plurality of branch logic blocks, said method comprising:

constructing, in a memory coupled in communication with a processor of said computer, a graph having a plurality of nodes representing said plurality of logical operations and a plurality of edges connecting those of said plurality of nodes which do not conflict;

assigning to each of said edges, in said memory, a weight comprising a bit width difference between end nodes of each of said edges;

enumerating, in said memory, weighted cliques each comprising at least two of said nodes representing respective ones of the logical operations that can share a same clock cycle of said digital electronic integrated circuit;

generating, in said memory, a plurality of multiplexer-operation groups by replacing each of said weighted cliques with a single one of said logical operations and a multiplexer, such that each logical operation in one of said multiplexer-operation groups can be shared within a same clock cycle of said digital electronic integrated circuit; and facilitating manufacturing or programming a functionally equivalent representation of said digital electronic integrated circuit including said multiplexer-operation groups.

17. The non-transitory computer readable medium of claim 16, wherein said assigned weights have values no less than zero, and wherein said enumerated weighted cliques comprise minimum weighted cliques.

18. The non-transitory computer readable medium of claim 16, wherein said assigned weights have values no greater than zero, and wherein said enumerated weighted cliques comprise maximum weighted cliques.

19. The non-transitory computer readable medium of claim 18, wherein said constructing of said graph comprises:

constructing a preliminary graph having said plurality of nodes representing said plurality of logical operations and a plurality of preliminary edges connecting all of said nodes; and based on an analysis of said plurality of branch logic blocks, removing from said preliminary graph those of said plurality of preliminary edges connecting those of said plurality of nodes which do conflict, to leave said edges connecting those of said plurality of nodes which do not conflict.

20. The non-transitory computer readable medium of claim 19, further comprising computer executable instructions which when executed by said computer cause the computer to perform further method steps of:

updating a control data flow graph representing said digital electronic integrated circuit based on said enumerated maximum weighted cliques;

computing timing impact of said updated control data flow graph; and eliminating selected sharing of said logical operations if said timing impact indicates excessive timing degradation.

* * * * *